United States Patent
Croslin

[19]

[11] Patent Number: 6,075,766
[45] Date of Patent: Jun. 13, 2000

[54] METHOD AND APPARATUS FOR IDENTIFYING RESTORAL ROUTES IN A NETWORK

[75] Inventor: William D. Croslin, Colorado Springs, Colo.

[73] Assignee: MCI Communications Corporation, Washington, D.C.

[21] Appl. No.: 08/753,553

[22] Filed: Nov. 26, 1996

[51] Int. Cl.$^7$ .................................................. H04J 15/00
[52] U.S. Cl. .......................................... 370/225; 364/488
[58] Field of Search .............................. 370/225; 364/488

[56] References Cited

U.S. PATENT DOCUMENTS

| | | |
|---|---|---|
| 4,577,066 | 3/1986 | Bimonte et al. . |
| 4,920,529 | 4/1990 | Sasaki et al. . |
| 5,187,740 | 2/1993 | Swaim et al. ............................ 379/209 |
| 5,335,268 | 8/1994 | Kelly, Jr. et al. ........................ 379/112 |
| 5,459,716 | 10/1995 | Fahim et al. ............................... 370/16 |
| 5,463,615 | 10/1995 | Steinhorn . |
| 5,636,203 | 6/1997 | Shah ........................................ 370/244 |
| 5,646,936 | 7/1997 | Shah et al. ............................... 370/228 |
| 5,872,524 | 2/1999 | Iida ......................................... 370/254 |

FOREIGN PATENT DOCUMENTS

| | | |
|---|---|---|
| 0 494 513 A2 | 4/1995 | European Pat. Off. . |
| WO 95/10149 | 4/1995 | WIPO . |

OTHER PUBLICATIONS

Manione et al. "An Inconsistencies Tolerant Approach in the Fault Diagnosis of Telecommunications Networks" Feb. 14, 1994.

Bouloutas, et al. "Alarm correlation and Fault Identification in Communication Networks" Feb. 1, 1994.

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.

Grover et al. "Near Optimal Spare Capacity Planning in a Mesh Restorable Network" IEEE Jan. 1991.

Hasegawa et al. "Dynamic Reconfiguration of Digital Cross–Connect Systems with Netwok Control and Management" IEEE.

Bellary, et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazaki et al. "Network Fault Management" Sep. 1992.

Newport et al. "Network Survivability Through Connectivity Optimization" IEEE 1987.

Flanagan et al. "Principles and Technologies for Planning Survivability–A Metropolitan Case Study", IEEE 1989.

M. Wehr "Protection of Synchronous Transmission Networks", Commutation and Transmission, No. 4, 1993.

Coan, et al. "Using Distributed Topology Update and Preplanned Configurations to Achieve Trunk Network Survivability" IEEE Oct. 1991.

*Primary Examiner*—Brian Zimmerman

[57] ABSTRACT

A method and apparatus analyzes network topology data of a telecommunications network. Each physically diverse path in the network is assigned a unique path identifier. Trunks along each path, and ports at nodes through which the trunks are routed, are assigned the corresponding path identifier. If a trunk fails, the ports facing the point of failure issue alarms that include the corresponding path identifier for the trunk. A computer or other system compares the path identifiers of the alarming trunks with the path identifiers of restoral routes, such as other trunks extending between end nodes at opposite ends of the failure. Only those trunks having path identifiers differing from the path identifier of the alarming trunk are selected as possible restoral routes for the failure.

33 Claims, 2 Drawing Sheets

METHOD AND APPARATUS FOR IDENTIFYING RESTORAL ROUTES IN A NETWORK

TECHNICAL FIELD

The present invention relates to analyzing communication systems, including analyzing systems for restoration after a network suffers from an unplanned outage or break in a signal path.

BACKGROUND OF THE INVENTION

In the telecommunications field, particularly in long distance networks, long distance network providers continually strive to increase the traffic carrying capability of their transmission medium. For example, since fiber optic cables have increased bandwidth over known twisted pair or copper wire cables, fiber optic cables are used increasingly for connecting network stations and other network elements. As a result, a greater number of stations or network elements can be connected over a fewer number of fiber optic cables, as opposed to prior cables. In other words, each fiber optic cable can handle numerous trunks, as opposed to prior cables.

Unfortunately, if one or more of the fiber optic cables fail, massive disruption of services to a large number of network customers and users can result. Network service providers or telecommunications carriers therefore strive to quickly and economically restore traffic effected by these disruptions or "outages." Restoring network outages generally requires four steps: (1) detecting the network failure, (2) isolating the location of the failure in the network, (3) determining a traffic restoral route, and (4) implementing the restoral route. Network restoration must be executed quickly to ensure minimal interruption of network traffic. Therefore, nearly all telecommunications carriers wish to restore traffic within a few seconds or less. The telecommunications carriers typically restore the highest priority network elements first, and as many of such elements as possible within a short period of time.

Often, multiple transmission systems, such as optical fibers, are combined or bundled and positioned along a common geographic or physical path. For example, many optical fibers are typically bundled into a single cable, which is buried underground between two nodes. Each of these optical fibers supports multiple trunks in a network. For example, each optical fiber can be a separate DS-3 level trunk, which can support 672 separate DS-0 level trunks.

The optical fibers or other transmission systems can suffer from outages caused by numerous events, such as fire, construction equipment, water pressure, animals, etc. While an outage may impact one fiber in a cable bundling multiple fibers, it may not immediately impact other fibers in that same cable. For example, repeated freezing and thawing of water which has seeped into the cable can cause a few, and then several, fibers to suffer intermittent or total outages over a span of several months. As another example, a fire may slowly burn through the cable, sequentially causing outages in each fiber as the fire burns through the cable, where each fiber suffers an outage at distinct intervals of time. As a result, when a given optical fiber in a cable suffers an outage, other fibers in the same bundle will likely also suffer from an outage thereafter.

When a failure occurs in the network, a network restoration system receives numerous alarms for each failed trunk on a failed transmission system (e.g., on an optical fiber). Each node traversed by a failed trunk produces an alarm, and as noted above, multiple trunks often fail as optical fibers fail. Since each trunk in the network typically traverses multiple nodes, the network typically produces numerous alarms from multiple nodes as a result of a failure. However, another optical fiber bundled with the failed optical fiber could at a given moment not yet be impacted, and therefore not generate alarms. Therefore, while numerous alarms are generated at a given moment, sometime thereafter, after other optical fibers fail, the network will produce even more numerous alarms. Because other optical fibers bundled with the first failed optical fiber will also likely fail, the network restoration system should not use any trunks bundled with the first failed optical fiber for restoral routes. Instead, the network restoration system should look for other trunks to use as restoral routes, preferably trunks along physically diverse paths.

The information of physically diverse paths, however, is not readily apparent in network topology data. To determine where in the network a failure has occurred, a central location performs numerous algorithms to apply or correlate various alarms generated in response to the failure with each corresponding trunk in the network topology. The computer or analyst then matches the alarms to physical network topology to isolate the location of the failure within the network, and thereby locate the physical path of the failed trunk. Thereafter, the analyst can locate a physically or geographically diverse path as a restoral route.

For example, if the network restoration system employs DS-3 trunks, the network topology data will likely reflect only nodes in which DS-3 trunks are switched, such as nodes containing DS-3 Digital Cross-Connects (DXC 3/3). The network topology data will likely not reflect intervening nodes, which serve as pass-through nodes for DS-3 trunks. Thus, two DS-3 trunks may be physically diverse by virtue of different intervening, pass-through nodes, but since they share the same DXC 3/3 end nodes, they appear in the network topology data to share the same physical path.

As a result, when a failure occurs and the network restoration system correlates the alarms with the network topology data, the system must analyze the topology data for the entire network. In other words, the network restoration system must analyze the network topology data at various levels, and throughout the network, to determine which spare routes have paths that are physically diverse from the failed path. Such an analysis requires extensive processing, particularly because it typically includes analyzing network topology data at levels lower than the DS-3 level to ensure that all intervening nodes are considered. Such extensive processing necessarily requires processing time, and therefore increases the delay in restoring the network following the failure. As noted above, telecommunications carriers desire to restore outages in the network as quickly as possible.

After isolating the failure, the analyst then identifies an appropriate pre-plan. Currently, telecommunications carriers simulate possible failures and determine restoral routes to develop a "pre-plan" by collecting large amounts of data reflecting the logical topology of the network. The collected data is often retrieved from network engineering databases which reflect the logical construction of the network, such as indicating the connections and paths of all network traffic trunks. An engineer or network analyst analyses the collected data, compares the collected data to the geographic or physical layout location of the network, and then generates the pre-plans therefrom. Since the pre-plans are developed prior to any failure in the network, when a failure does occur, a plan already exists for restoring traffic affected by the failure. In general, a pre-plan corresponds to a segment of the network that can incur a failure. If that segment fails, then the corresponding pre-plan is retrieved, and its restoral route implemented. Since most telecommunications networks are complex, substantial time-consuming processing is required to analyze all of the logical topology data for each node-to-node span of each trunk and determine a restoral route.

SUMMARY OF THE INVENTION

The present invention preferably first determines the physical diversity of paths in a network prior to a network failure. Thereafter, the present invention preferably uses this prior determination of physical diversity of paths to identify an appropriate restoral route. Under the present invention, traffic routes along physically diverse paths are preferably assigned path identifiers unique to each physically diverse path. Path identifiers specify singular physical paths that are shared by one or more transmission systems, and a single path identifier can correspond to multiple traffic trunks and routes. For example, a given cable along a certain physical path can include multiple optical fibers, each of which can represent a DS-3 level trunk. Each of such DS-3 trunks can then be assigned the same path identifier between common end nodes. A different cable carrying different DS-3 level trunks extending between the same end nodes are then all assigned a different path identifier.

Each equipment port through which a given trunk is routed is assigned a path identifier which corresponds to the physical path of the trunk traversing the port. When a failure occurs in the network, each port directed to or "facing" the failure generates an alarm and provides the path identifier for the port to a network restoration system. The restoration system then compares the path identifiers of the alarming trunks with those of spare trunks along a failure span to path identifiers of spare trunks. The restoration system then selects only spare trunks with path identifiers different from the path identifiers of the alarming trunks. As a result, the restoration system eliminates the prior time-consuming analysis of network topology to determine a physically diverse restoral route when alarms are received.

In sum, the present invention embodies a method and apparatus analyzes network topology data of a telecommunications network. Each physically diverse path in the network is assigned a unique path identifier. Trunks along each path, and ports at nodes through which the trunks are routed, are assigned the corresponding path identifier. If a trunk fails, the ports facing the point of failure issue alarms that include the corresponding path identifier for the trunk. A computer or other system compares the path identifiers of the alarming trunks with the path identifiers of restoral routes, such as other trunks extending between end nodes at opposite ends of the failure. Only those trunks having path identifiers differing from the path identifier of the alarming trunk are selected as possible restoral routes for the failure. As a result, the present invention enhances network restoration processes by providing an automated method of determining physical diversity of paths in a network prior to a failure, and then employing such determined physical diversity of paths to identify an appropriate restoral route.

The present invention embodies a method for analyzing a network, where the network has a plurality of transmission systems coupling a plurality of nodes. Each transmission system has one or more channels traversing two or more nodes. The method includes the steps of (a) determining physically diverse paths in a network based on the plurality of nodes in the network; and (b) assigning at least one path identifier to one or more channels extending along one of the corresponding physically diverse paths, each path identifier corresponding to only one physically diverse path.

The present invention also embodies a method for determining a restoration route for a failure within the network. The failure causes a plurality of alarms to be issued. The method includes the steps of: (a) determining path identifiers for at least some of the plurality of alarms, each path identifier identifying a unique path traversed by at least a portion of one or more channels; (b) comparing the path identifiers for the at least some of the plurality of alarms with path identifiers corresponding to restoration routes in a set of restoration routes; and (c) selecting at least one restoration route from the set of restoration routes, the at least one restoration route having a path identifier that differs from the path identifiers for at least most of the plurality of alarms.

DETAILED DESCRIPTION OF THE INVENTION

A telecommunications network, and in particular, a method and apparatus for analyzing the network, is described in detail herein. In the following description, numerous specific details are set forth such as ordering and execution of steps under an analysis routine, certain steps for analyzing portions of a network, etc., in order to provide a thorough understanding of the present invention. One skilled in the relevant art, however, will readily recognize that the present invention can be practiced without the use of the specific details described herein, or with other specific steps in a routine, etc. Well-known structures and steps are not shown or described in detail in order to avoid obscuring the present invention.

Figure 1:
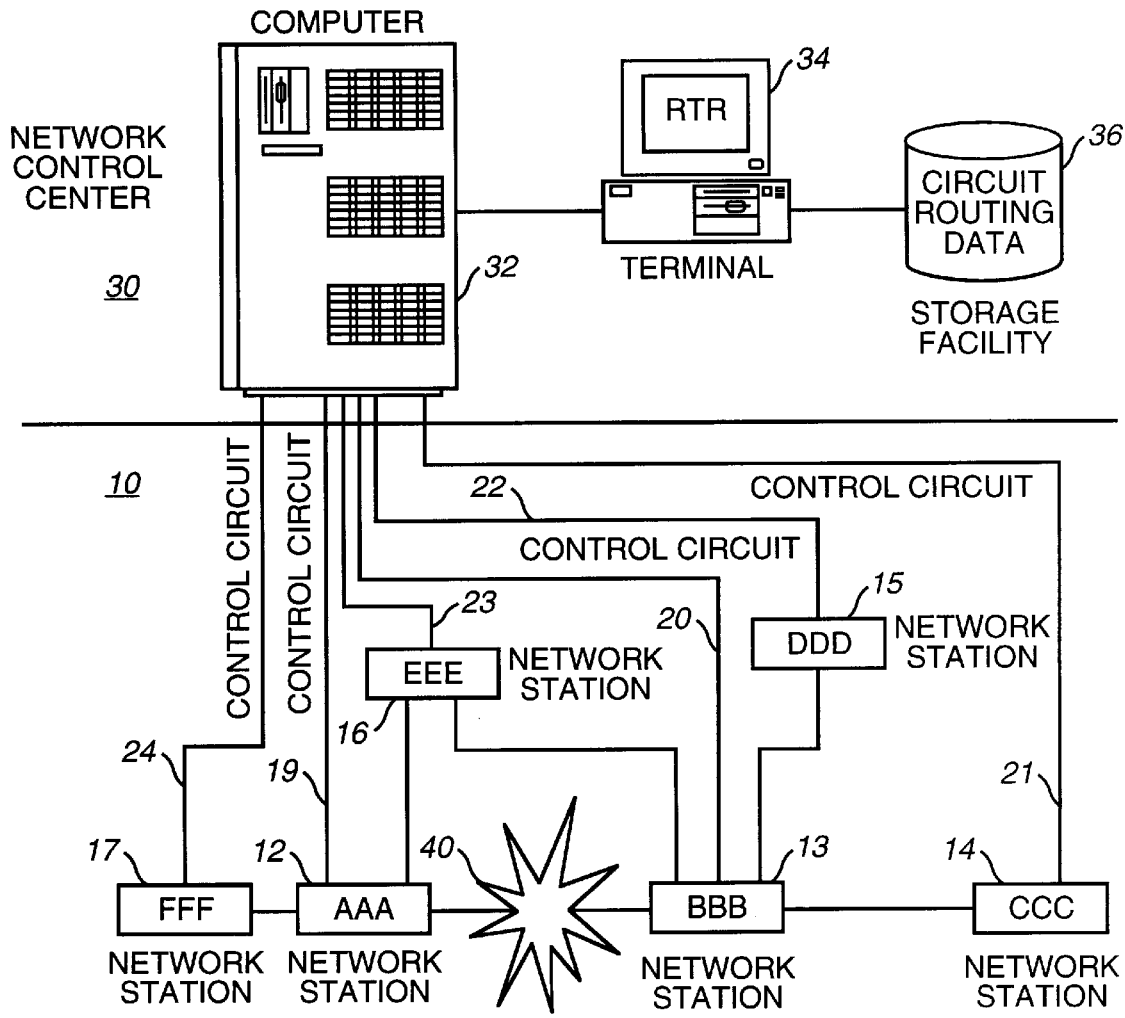
FIG. 1 is a block diagram of a portion of a network, including a network control center.

Referring to FIG. 1, a simplified telecommunication system is shown to help understand the present invention. As shown in FIG. 1, a telecommunications network 10 includes interconnected network stations or nodes AAA, BBB, CCC, DDD, EEE, and FFF, designated as stations 12–17, respectively. A "node" as used generally herein, refers to a physical link in a network, representing a terminal or system which may serve any of a number of functions. For example, each node can include digital cross connect (DXC) systems, multiplexing equipment, line termination equipment, and/or fiber transmission systems. A DXC system is a complex digital switch capable of automatically switching trunks based on external commands. A "trunk," as generally used herein, is a logical channel of communications capacity that traverses one or more nodes and one or more links between nodes (e.g., DS-0, DS-1, DS-3, etc.). In other words, a trunk is a channel of communications through the network of a given bandwidth. For example, a DS-3 level trunk is capable of carrying 672 DS-0 level trunks. Line termination equipment and fiber transmission systems typically include light-to-electricity transducers and/or multiplexers, as is known in the art.

Under normal conditions, communications traffic is routed between the network nodes 12–17 along trunks, and between these and other network nodes of the larger network 10 of which the portion shown in FIG. 1 forms a part thereof. Each node typically has a unique address or designator in the network 10. In addition, each node 12–17 is connected by control circuits 19–24, respectively, to a network management or control center 30. The control circuits 19–24 may each be an X.25 circuit, which is a known circuit for carrying control communications between the associated node and the network control center 30.

The network control center 30 includes a computer 32 and a terminal 34 for interacting with the computer 32, which provides an interface for human interaction. The network control center 30 also includes a storage facility 36 for storing network and circuit routing data, topology data, pre-plans, etc. Several of such network control centers 30 can be distributed throughout the network 10.

When an outage or disruption of telecommunications traffic occurs, such as the failure 40, the nodes 12–17 that couple to trunks or circuits impacted by the disruption recognize the disruption. In response to the recognized disruption, two or more of the nodes 12–17 generate alarms that are sent over the control circuits 19–24 to the network control system 30. As described below, the network control system 30 determines the location of the outage from these alarms.

Under the present invention, the computer 32 retrieves from the storage facility 36 information about the impacted circuits including the paths that they follow and the equipment they pass through at different nodes along the paths. Based on this data, the network control system 30, or a network analyst, can implement a pre-plan and/or restore telecommunications traffic on the network despite the outage.

The network control center 30 or the analyst implements the alternative routes in the network 10 by establishing new connections via commands transmitted through the control circuits 19–24, or alternatively, depending upon the equipment employed at the nodes 12–17, by other means of transmission to effect or direct manual actions to be taken at the nodes. For example, spare high bandwidth DS-3 trunks typically exist throughout the network 10, which can be employed to restore an outage in the network. The network 10 is quite effectively restored when the nodes 12–17 employ DXC systems that can automatically switch from one trunk to another based on commands from the network control center 30.

Figure 2:
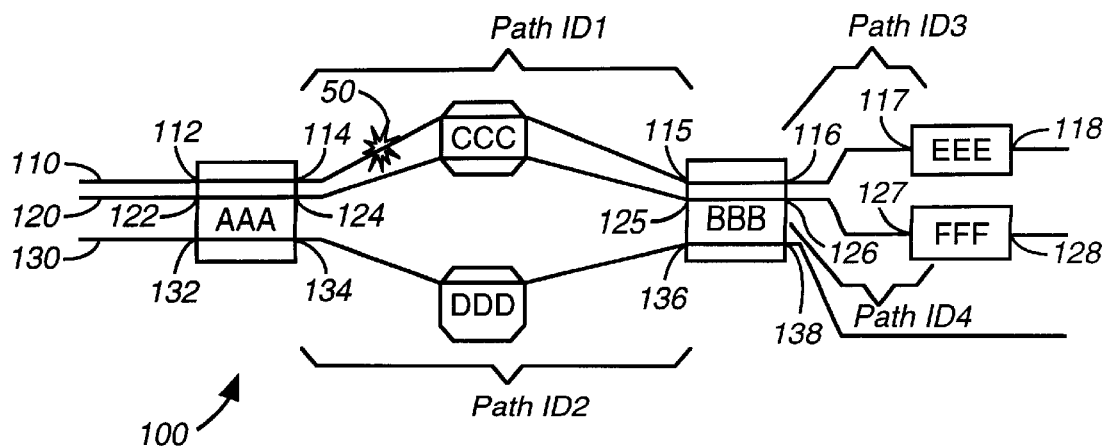
FIG. 2 is a block diagram of a first alternative portion of the network of FIG. 1.

Referring to FIG. 2, an exemplary network portion 100 of the network 10 for illustrating the concept of physically diverse paths is shown as having nodes designated as AAA, BBB, CCC, DDD, EEE and FFF. Two distinct transmission systems 110 and 120 extend between the nodes AAA and BBB, through the nodes CCC, while a third transmission system 130 similarly extends between the nodes AAA and BBB, but through the node DDD. The transmission systems 110 and 120 can, for example, be bundled as a single cable extending between the nodes AAA and BBB. After the node BBB, the transmission systems 110 and 120 diverge, so as to be routed to different nodes EEE and FFF, respectively. The transmission systems 110, 120, and 130 can represent optical fibers or other structure for transmitting a signal in the network 10.

The nodes AAA, BBB, EEE and FFF are nodes represented in the network topology data for the network 10 at a given level of granularity. For example, if the transmission systems 110–130 are optical fibers supporting DS-3 level trunks, then the nodes AAA and BBB can be DXC 3/3 terminals, in which individual DS-3 trunks can be added to or removed from the transmission systems. In other words, the DXC 3/3 terminals can add or subtract lower bandwidth DS-1 or DS-0 trunks transmitted along the transmission systems 110–130.

The transmission systems 110–130 share the same end nodes AAA and BBB. Therefore, the transmission systems 110–130 are routed between the same two geographic points at which the nodes AAA and BBB are located. The nodes CCC and DDD of the network portion 100 of FIG. 2 are simply pass-through nodes. As generally used herein, a "pass-through node" is a node with only two links for which all trunks entering the node leave the node on another link, so that no switching or terminating of traffic occurs. In other words, the number of trunks entering the node equals the number of trunks leaving the node; there are no terminating or diverging trunks at that node, as is described more fully below. A pass-through node can include a digital repeater or generator. A "link," as generally used herein, is a physical connection between two nodes, representing any type and any capacity of communications between the nodes, such as one or more DS-3 level trunks. A single link usually consists of multiple trunks, and a single trunk consists of one or more links that span multiple nodes. In general, most high capacity networks contain far more trunks than links. A "segment," as generally used herein, is a single portion of a trunk that spans between two adjacent nodes, or in other words, is a single link of a single trunk.

Importantly, the transmission systems 110 and 120 share a common physical path between the nodes AAA and BBB, while the transmission system 130 employs a physically diverse path between the nodes AAA and BBB. If a failure 50 impacts the transmission system 110 between the nodes AAA and BBB, it is likely that the failure will, soon thereafter, impact the transmission system 120. As a result, the network control center 30 preferably does not employ the transmission system 120 as a restoration or restoral route, but instead employs the physically diverse transmission system 130, as described below.

In response to the failure 50, the trunks supported by the transmission system 110 each cause alarms to be generated. For example, each transmission system that traverses a node enters that node on one or more ports and leaves the node on another port(s). If the transmission system, for example, includes multiple DS-3 level trunks, each trunk then typically enters and leaves a node on a separate port. Use of the terms "enters" and "leaves" is arbitrary; the directionality of trunks within the network 10 is irrelevant.

When a failure occurs in the network 10, each trunk that is impacted by the failure will cause ports coupled to that trunk to generate alarms. Only those ports that are positioned towards or "face" the point of failure will generate an alarm. For example, the failure 50 impacting the transmission system 110 will cause ports 114, 115 and 117 to issue alarms, but ports 112, 116 and 118 will not issue such alarms, since they do not "face" the failure. While the ports 112–118, as well as ports 122, 124, 125, 126, 127 and 128 for the transmission system 120, and ports 132, 134, 136 and 138 for the transmission system 130 are each shown schematically in FIG. 2 as a single port, if the transmission systems 110–130 include multiple DS-3 level trunks, each of such trunks is coupled to, and capable of producing alarms from, ports at the nodes.

In response to the failure 50, the computer 32 of the network control center 30 receives or collects the alarms issued from the ports 114 and 116. As noted above, the nodes AAA, BBB, EEE and FFF represent DS-3 level nodes, and thus the computer 32 receives only the alarms at the DS-3 level. As a result, the computer 32 is not overwhelmed with numerous alarms from the network 10. However, the computer 32 does not receive any alarms, if generated, by the pass-through node CCC, because this node represents a lower level of granularity in the network 10 (e.g., represents terminating or diverging trunks at the DS-1 or DS-0 level). Consequently, based on the alarms received from the ports 114, 115 and 117, the computer 32, under prior systems, would determine that a failure occurs between the nodes AAA and BBB on the transmission system 110, but also determines that the transmission systems 120 and 130 similarly extend between the nodes AAA and BBB. In order to determine which, if any, of the two unaffected transmission systems 120 or 130 are physically diverse, prior restoration systems would require topology data of all levels of the network 10 to be analyzed. Based on such analysis, such prior system would then determine which transmission systems traverse different paths between the nodes AAA and BBB, and then designate the transmission system on a diverse path as the restoral route. As noted above, such a prior system is extremely time-consuming.

The present invention, instead, determines physical diversity prior to any failures in the network 10. The present invention assigns a unique path identifier to each physically diverse path. Since a single traffic trunk can traverse multiple segments, a trunk can have multiple trunk identifiers along its entire length. However, each individual segment of a trunk will have only one path identifier.

Path identifiers correspond to the physical path of a transmission system, and are assigned to each port along that path. For example, a single path identifier ID1 is assigned to both of the transmission systems 110 and 120 between the nodes AAA and BBB. However, between the nodes BBB and EEE, the transmission system 110 is assigned a path identifier ID3, whereas between the nodes BBB and FFF, the transmission system 120 is assigned a path identifier ID4. In yet another unique path identifier ID2 is assigned to the transmission system 130 between the nodes AAA and BBB, because it takes a physically diverse path from the transmission systems 110 and 120, between the same nodes.

The path identifiers can be any data string, such as a numeric or alphanumeric string. The path identifiers can be alphanumeric strings or mnemonics, rather than arbitrary strings, so as to represent corresponding geographic paths or points or nodes along the path. For example, the path identifiers ID1 and ID2 could include a series of nodes traversed by the paths, e.g., AAA-CCC-BBB and AAA-DDD-BBB, respectively. The path identifiers must have a length sufficient to uniquely identify each unique physical path in the network 10. The alarms with the path identifiers can include additional data and can have various formats.

Each port at each node is assigned a single path identifier. For example, each of the ports 114, 115, 124, and 125 are assigned the path identifier ID1, while the ports 134 and 136 are each assigned the path identifier ID2. (Since the ports shown in FIG. 2 can represent multiple physical ports for a given transmission system, each of such physical ports coupling to a single optic fiber are assigned a path identifier.) When a failure occurs and the port generates an alarm, the port provides both the alarm and its assigned path identifier to the computer 32. The computer 32 in the network control center 30 then receives both the alarms and the path identifiers of all of the alarming ports in the network 10. The computer 32, as described below, compares the path identifiers of the alarming ports with the path identifiers of trunks that have been designated as restoral routes for a given failure or failure span, and the computer will exclude any trunks having the same path identifier as the alarming trunks.

As generally used herein, a "failure span" is a span of the physical topology of the network, consisting of one or more links, having a singular point of failure in which all traffic carried by the span may be restored by a single plan. A failure span is a maximum length of the network 10 (in terms of nodes and links) that can be singularly restored. The present invention preferably employs physical topology data that represents the maximum failure spans of a network, such as the failure spans generated by the inventor's copending U.S. patent application "Method and Apparatus for Determining Maximum Network Failure Spans for Restoration," filed concurrently herewith, and incorporated by reference herein. The maximum failure spans more closely reflect the physical topology shown in FIG. 2, as well as the counts of terminating and diverging trunks at each node. The physical topology will rarely change in a typical telecommunications network. As described in the above application, failure spans are preferably calculated regularly, such as once a day, to virtually guarantee that the failure spans are accurate.

Under the present invention, if the transmission system 110 incurs the failure 50, but the transmission systems 120 and 130 do not incur such a failure, all of the trunks supported by the transmission system 110 will generate alarms from the ports 114, 115, and 117. The alarms, as well as the path identifiers transmitted with the alarms, are received by the computer 32. The computer 32 then compares the path identifiers of the failed trunks (i.e., ID1) with the path identifiers of trunks capable of being used as restoral routes, such as the trunks supported by the transmission systems 120 and 130 (i.e., path identifiers ID1 and ID2, respectively). The trunks supported by the transmission system 120 have the same path identifier as the alarming trunks (i.e., the trunks supported by the transmission system 110). As a result, the computer 32 excludes the transmission system 120 from a possible restoral route. The trunks supported by the transmission system 130 have a different path identifier, and thus will be included as a possible restoral route, as described in detail below.

Figure 3:
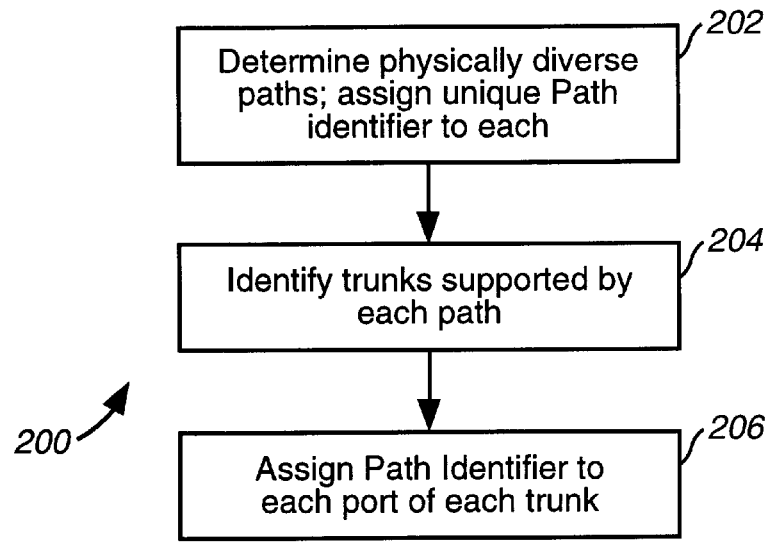
FIG. 3 is an exemplary flowchart diagram of a method for identifying geographically diverse paths under the present invention.

Referring to FIG. 3, a routine 200 performed by the computer 32 in the network control center 30 determines diversity of paths within the network 10 and assigns appropriate path identifiers. The routine 200, as well as a routine 300 discussed below, can be performed on any type of computer. Beginning in step 202, the computer 32 analyzes the network topology data stored in the storage device 36. The computer 32 preferably employs physical topology data for the network 10, such as the physical topology data derived under the inventor's co-pending U.S. Patent Application entitled "Method and Apparatus for Deriving and Representing Physical Network Topology," filed concurrently herewith and incorporated by reference herein. In step 202, the computer 32 analyzes the physical topology data to determine physically diverse paths in the network 10. The computer 32 assigns a unique path identifier to each physically diverse path. For example, referring to the portion 100 of FIG. 2, the computer 32 determines that the path extending between nodes AAA-CCC-BBB is a path physically diverse from the path AAA-DDD-BBB. Therefore, the computer 32 assigns these two paths separate and unique path identifiers ID1 and ID2, respectively.

In step 204, the computer 32 identifies the trunks that traverse each path identified in step 202. Specifically, the computer 32 identifies the ports through which the trunks on a given path extend. For example, the computer 32 identifies that the trunks supported by the transmission system 110 extend through the ports 114, 115, 116, 117, etc.

In step 206, the computer 32 assigns the appropriate path identifier to each port based on the path corresponding to the trunk extending through the given port. Each port is assigned only one path identifier. For example, the ports 114, 115, 124, and 125 are all assigned the path identifier ID1. Similarly, the ports 116 and 117 are assigned the path identifier ID3, the ports 134 and 136 are assigned the path identifier ID2, and the ports 126 and 127 are assigned the path identifier ID4. As a result, when a trunk extending through any of the ports suffers a failure, then the port issues an alarm with its correspondingly assigned path identifier. Since the path identifier corresponds to the physical path along which the trunk extends, similar path identifiers correspond the trunks extending along common physical paths, while trunks extending along physically diverse paths have different path identifiers. The path identifiers issued from these ports with alarms help expedite restoration of the network 10 as described below.

Logical topology of the network 10 changes frequently, such as the rerouting of a traffic trunk, but such rerouting generally does not impact physical topology data. Nevertheless, the computer 32 preferably performs the routine 200 regularly, such as on a daily basis. As a result, the computer 32 regularly assigns appropriate path identifiers to each trunk (and port coupled to the trunk) in the network 10. The chance of erroneously assigning path identifiers for the network 10 based on the physical topology data is small, despite frequent rerouting of traffic trunks, etc.

After identifying and assigning appropriate path identifiers under the routine 200, the resulting data can be output and used in a variety of applications that analyze the network 10 and require data reflecting physically diverse paths in the network. For example, the resulting data can be used to determine restoral routes to restore traffic following a failure in the network 10.

Figure 4:
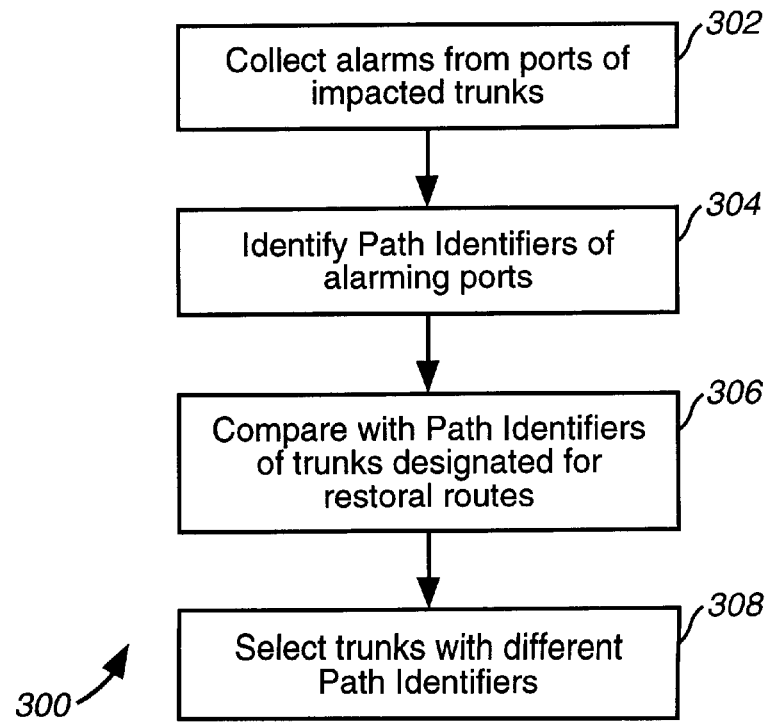
FIG. 4 is an exemplary flowchart diagram of a method for selecting appropriate restoration paths under the present invention.

Referring to FIG. 4, a routine 300 performed by the computer 32 determines restoral routes to restore traffic following a failure in the network 10. Beginning in step 302, the computer 32 receives or collects alarm signals from ports of two or more nodes in the network 10. The present invention preferably receives alarms from the network at higher levels of analysis or granularity, such as at the DS-3 level. As a result, alarms are not received from all of the intervening nodes or ports in the network 10, such as not receiving alarms from the pass-through nodes CCC and DDD. By limiting the number of alarms that are received by the present invention, the computer 32 can perform the routine 200 more rapidly.

As noted above, a failure in the network 10 will typically impact several trunks. Therefore, each node through which the trunks are routed could issue multiple alarms, such as the nodes AAA, BBB and EEE that issue alarms in response to the failure 50. Importantly, each of the alarms issued from the ports 114, 115, and 117 include path identifiers.

In step 304, the computer 32 identifies the path identifiers of each of the alarming ports. For example, the computer 32 determines that the alarms received from the ports 114 and 115 both include the path identifier ID1, while the alarms received from the port 117 includes the path identifier ID3.

In step 306, the computer 32 compares the path identifiers of the alarming ports with restoral routes along a given path. Restoral routes can be assigned based on previously determined pre-plans, as is known in the art. Preferably, the present invention employs restoral routes derived based on the inventor's co-pending U.S. Patent Application entitled "Method and Apparatus for Determining Maximum Network Failure Spans for Restoration." For example, the computer 32 in step 306 determines that the transmission systems 120 and 130 are both possible restoral routes for a failure in the transmission system 110, for the network span extending between the nodes AAA and BBB.

In step 308, the computer 32 selects as restoral routes only trunks having different path identifiers from the path identifiers produced from the alarming ports in response to a failure of one or more trunks. In other words, the computer 32 selects only trunks along paths physically diverse from the paths along which the failed trunk extends. For example, the computer 32 in step 308 selects as a restoral route any of the trunks assigned the path ID2 on the transmission system 130, since they have a different path ID from the path ID1 of the trunks of the transmission system 110. The trunks on the transmission system 120 have the same path ID (i.e., path ID1) as the trunks on the failed transmission system 110, and thus are not selected under step 308.

The data derived under the analysis at the network 10 under the present invention can be employed in numerous applications. For example, after identifying one or more appropriate restoral routes in the network 10 under the routine 300, the computer 32 can compensate for the failure under a prescribed pre-plan. Each restoral route determined under the routine 300 will determine what restoration pre-plan is needed for that portion of the network 10. Alternatively, the present invention can be employed to create pre-plans prior to failures by simulating failures in the network 10. Pre-plans, which result in a 1-to-1 correspondence between each failure in the network 10 and a restoral route, can be effectively and efficiently generated under the inventor's above-noted copending U.S. patent applications and his copending U.S. patent applications entitled "Method and Apparatus for Isolating Network Failures" and "Method and Apparatus for Isolating Network Failures By Correlating Paths Issuing Alarms With Failure Spans," filed concurrently herewith, and incorporated by reference herein. By maximizing a network span to identify a failure span, the efficiency of restoration pre-plans are maximized under these applications by minimizing the number of pre-plans needed for the network 10.

The restoral routes determined under the routine 300 can not only be implemented under a pre-plan, but also under dynamic route generation. Under dynamic route generation, the computer 32 dynamically calculates a restoral route after detecting and isolating a failure, rather than generating a pre-plan prior to such a failure. Dynamic route generation is preferably entirely automatic, without human interaction, and thus can be more efficient and timely than current methods for implementing pre-plans.

The present invention, as described herein, provides a unique path identifier for each physically diverse path in the network 10. The path identifiers are assigned to each transmission system or trunk in the network 10 prior to an outage. As a result, while prior systems must correct and analyze large amounts of data to determine restoral routes when a failure occurs, much of the processing occurs before a failure is detected under the present invention. As a result, when a failure does occur, the present invention provides a method of quickly and efficiently determining a geographically or physically diverse restoral route. The present invention requires that the restoration process make only a simple comparison with the path identifiers of alarming trunks with the path identifiers of restoral routes to select restoral routes having path identifiers which differ from those of the alarming trunks.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other communications or network systems, not necessarily the exemplary systems described above. For example, while the present invention as been generally described above as being employed in the telecommunications network 10, the present invention is equally applicable to other communication systems, such as a network of computers.

The present invention can employ data based on a trunk of any type and capacity. Furthermore, while the terms trunk and link are defined above as routing telecommunications traffic, the present invention can analyze and determine restoral routes within any communication channel or path between nodes and employ any topology data representing such channels or paths, as will be understood by those skilled in the relevant art. Moreover, the term node applies to any point receiving or transmitting signals, not necessarily a DXC system or other telecommunications equipment coupled between two trunks.

While certain operations under the present invention have been described as occurring generally in a serial fashion, those skilled in the relevant art will recognize that it is entirely within the scope of the invention to conduct some operations more or less simultaneously, or even in alternative order, from that described herein. Furthermore, the present invention can be modified to include or employ the systems and concepts of the inventor's copending applications noted above.

These and other changes can be made to the invention in light of the above detailed description. In general, in the following claims, the terms used should not be construed to limit the invention to the specific embodiments disclosed in the specification and the claims, but should be construed to include any network analysis system that operates under the claims. Accordingly, the invention is not limited by the disclosure, but instead its scope is to be determined entirely by the following claims.

What is claimed is:

1. In a telecommunication network having a plurality of nodes interconnected by links, each link having one or more trunks traversing two or more nodes, a computer-implemented method for determining restoration routes in response to failures within the network, the method comprising the steps of:

receiving a plurality of alarms from several nodes in the network, each of the alarms indicating a failure impacting one or more trunks within the network;

determining path identifiers for each of the plurality of alarms, each path identifier identifying a unique physical path traversed by at least a portion of one or more trunks;

identifying a set of restoration routes for the failure, each restoration route in the set of restoration routes having a corresponding path identifier;

comparing the path identifiers for each of the plurality of alarms with the path identifiers of the restoration routes in the set of restoration routes; and selecting at least one restoration route from the set of restoration routes, the at least one restoration route having a path identifier which differs from the path identifiers for each of the plurality of alarms.

2. The method of claim 1 wherein the step of receiving a plurality of alarms from several nodes in the network includes receiving previously assigned path identifiers together with each of the plurality of alarms as issued from the several nodes.

3. The method of claim 1 wherein the step of identifying a set of restoration routes for the failure includes identifying restoration routes for the network and assigning path identifiers to the identified restoration routes prior to the step of receiving a plurality of alarms from several nodes in the network.

4. The method of claim 1 wherein the step of receiving a plurality of alarms from several nodes in the network includes receiving alarms for only DS-3 telecommunication links in the network.

5. The method of claim 1, further comprising the step of implementing a network restoration plan based on the selected restoration route, wherein the restoration plan includes rerouting instructions for the network to compensate for the failure.

6. The method of claim I wherein each node in the network includes a plurality of ports, each port being directed toward a single segment of one of the plurality of trunks, and wherein the step of receiving a plurality of alarms from several nodes in the network includes the step of receiving alarms from all ports directed toward the failure.

7. In a network having a plurality of transmission systems coupling a plurality of nodes, each transmission system having one or more channels traversing two or more nodes, a computer-implemented method for determining a restoration route for a failure within the network, the failure causing a plurality of alarms to be issued, the method comprising the steps of:

determining path identifiers for at least some of the plurality of alarms, each path identifier identifying a unique path traversed by at least a portion of one or more channels;

comparing the path identifiers for the at least some of the plurality of alarms with path identifiers corresponding to restoration routes in a set of restoration routes;

selecting at least one restoration route from the set of restoration routes, the at least one restoration route having a path identifier that differs from the path identifiers for at least most of the plurality of alarms; and outputting data of the at least one restoration route.

8. The method of claim 7 wherein the step of determining path identifiers for at least some of the plurality of alarms includes receiving previously assigned path identifiers.

9. The method of claim 7 wherein the step of comparing the path identifiers for each of the plurality of alarms includes identifying restoration routes for the network and assigning path identifiers to the identified restoration routes prior to the step of determining path identifiers for at least some of the plurality of alarms.

10. The method of claim 7 wherein the network is a telecommunications network, wherein the transmission systems include optical fibers, wherein the channels are trunks, and wherein the step of determining path identifiers for at least some of the plurality of alarms includes receiving a plurality of alarms from several nodes in the network, at least some of the alarms including previously assigned path identifiers.

11. The method of claim 7 wherein the plurality of channels in the network include channels having greater and lesser bandwidth, and wherein the step of determining path identifiers for at least some of the plurality of alarms includes determining path identifiers for only the paths having the greater bandwidth.

12. The method of claim 7, further comprising the step of implementing a network restoration plan based on the selected restoration route.

13. In a network having a plurality of transmission systems coupling a plurality of nodes, each transmission system having one or more channels traversing two or more nodes, an apparatus for determining a restoration route for a failure within the network, the failure causing a plurality of alarms to be issued, the apparatus comprising:

a storage device having stored therein restoration routes for the network, including a set of restoration routes having path identifiers, each path identifier identifying a unique path traversed by at least a portion of one or more channels; and a computer system coupled to the storage device and coupled to receive the plurality of alarms, the computer system (a) determining path identifiers for at least some of the plurality of alarms, (b) comparing the path identifiers for the at least some of the plurality of alarms with the path identifiers for the set of restoration routes, and (c) selecting at least one restoration route from the set of restoration routes, the at least one restoration route having a path identifier that differs from the path identifiers for at least most of the plurality of alarms.

14. The apparatus of claim 13 wherein the computer system receives previously assigned path identifiers with the plurality of alarms.

15. The apparatus of claim 13 wherein the computer system identifies restoration routes for the network and assigns path identifiers to the identified restoration routes before determining path identifiers for at least some of the plurality of alarms.

16. The apparatus of claim 13 wherein the network is a telecommunications network, wherein the channels are trunks, wherein the nodes include ports coupled to the trunks, and wherein the computer system receives a plurality of alarms from ports in several nodes in the network, at least some of the alarms including previously assigned path identifiers.

17. The apparatus of claim 13 wherein the plurality of channels in the network include channels having greater and lesser bandwidth, and wherein the computer system determines path identifiers for only the paths having the greater bandwidth.

18. The apparatus of claim 13 wherein the computer system implements a network restoration plan based on the selected restoration route.

19. In a telecommunication network having a plurality of nodes interconnected by links and a plurality of trunks, each link having one or more trunks traversing two or more nodes through ports at the nodes, a computer-implemented method for analyzing the network, the method comprising the steps of:

analyzing the plurality of links interconnecting the plurality of nodes in the network;

determining physically diverse paths in the network based on the analyzed plurality of links;

assigning a unique path identifier to each physically diverse path;

identifying which trunks or portions of trunks in the plurality of trunks traverse each physically diverse path; and assigning path identifiers to ports at the nodes, each path identifier assigned to each port at the nodes corresponding to one of the identified trunks or portions of trunks.

20. The method of claim 19 wherein the step of analyzing the plurality of links interconnecting the plurality of nodes includes analyzing physical topology data of the network.

21. The method of claim 19 wherein the step of assigning path identifiers to ports at the nodes includes assigning path identifiers for only DS-3 telecommunication links in the network.

22. The method of claim 19, further comprising the step of creating a network restoration plan based on the assigned path identifiers, wherein the restoration plan includes rerouting instructions for the network to compensate for a failure in the network.

23. The method of claim 19 wherein the step of assigning path identifiers to ports at the nodes includes assigning mnemonics, each mnemonic corresponding to a series of geographic locations of at least a portion of one of the physically diverse paths.

24. In a network having a plurality of transmission systems coupling a plurality of nodes, each transmission system having one or more channels traversing two or more nodes, a computer-implemented method for analyzing the network, the method comprising the steps of:

determining physically diverse paths in the network based on the plurality of nodes in the network;

assigning at least one path identifier to the one or more channels extending along one of the corresponding physically diverse paths, each path identifier corresponding to only one physically diverse path; and outputting data of the assigned at least one path identifier.

25. The method of claim 24 wherein the plurality of channels in the network include channels having greater and lesser bandwidth, and wherein the step of assigning at least one path identifier to one or more channels includes assigning path identifiers for only the channels having the greater bandwidth.

26. The method of claim 24, further comprising the step of creating a network restoration plan based on the assigned path identifiers, wherein the restoration plan includes rerouting instructions for the network to compensate for a failure in the network.

27. The method of claim 24 wherein the step of assigning at least one path identifier to one or more channels includes assigning mnemonics, each mnemonic corresponding to a location of one of the physically diverse paths.

28. The method of claim 24 wherein the step of determining physically diverse paths in the network includes analyzing network topology data of the plurality of transmission systems in the network.

29. In a network having a plurality of transmission systems coupling a plurality of nodes, each transmission system having one or more channels traversing two or more nodes, an apparatus for analyzing the network, the apparatus comprising:

a storage device having stored therein topology data for the network; and a computer system coupled to the storage device, the computer system (a) determining physically diverse paths in the network based on the topology data for the network, and (b) assigning at least one path identifier to each channel extending along one of the corresponding physically diverse paths, each path identifier corresponding to only one physically diverse path.

30. The apparatus of claim 29 wherein the network is a telecommunications network, wherein the channels are trunks, wherein the nodes include ports coupled to the trunks, and wherein the computer system assigns path identifiers to the ports at the nodes.

31. The apparatus of claim 29 wherein the plurality of channels in the network include channels having greater and lesser bandwidth, and wherein the computer system assigns path identifiers for only the channels having the greater bandwidth.

32. The apparatus of claim 29 wherein the computer system creates a network restoration plan based on the assigned path identifiers, wherein the restoration plan includes rerouting instructions for the network to compensate for a failure in the network.

33. The apparatus of claim 29 wherein the computer system assigns mnemonics, each mnemonic corresponding to a location of one of the physically diverse paths.

* * * * *